3,033,650
PROCESS FOR THE CONVERSION OF DOLOMITE
TO MAGNESIUM HYDROXIDE
André Sablé, Marseille, France, assignor to Societe d'Electro-Chemie, d'Electro-Metallurgie et des Acieries Electriques d'Ugine, Paris, France, a corporation of France
Filed June 19, 1959, Ser. No. 821,399
Claims priority, application France June 30, 1958
3 Claims. (Cl. 23—201)

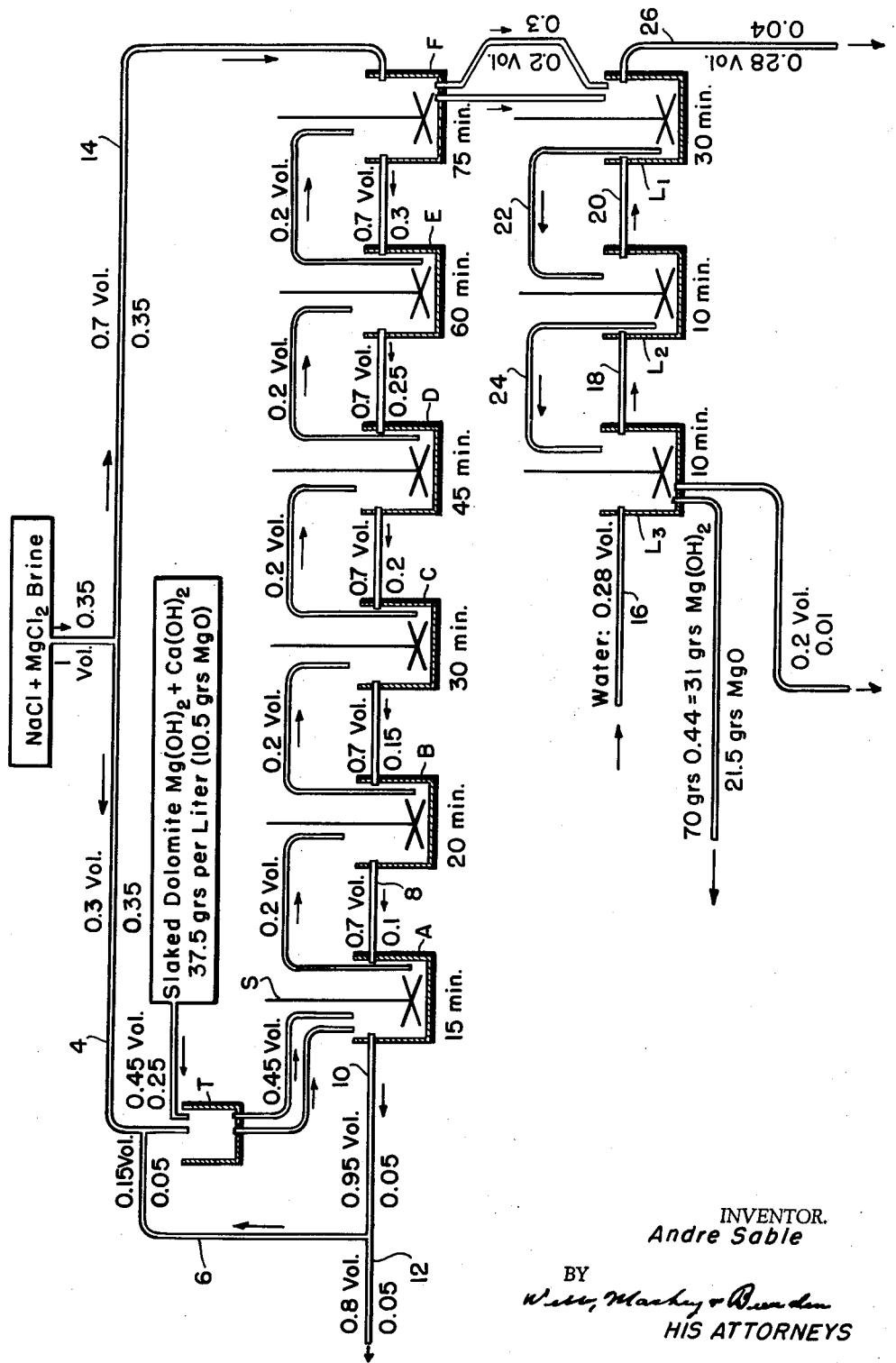

This invention relates to the process for the conversion of dolomite.

It is known that when dolomite is calcined to convert it into $MgO+CaO$ and then hydrated to convert it into $Mg(OH)_2+Ca(OH)_2$ and the hydroxide product is brought into contact with brines containing $MgCl_2$, the reaction may be represented as follows:

$$Mg(OH)_2+Ca(OH)_2+MgCl_2=CaCl_2+2Mg(OH)_2$$

thereby giving magnesium hydroxide and calcium chloride.

The difficulty of the operation consists in the lack of filterability of the magnesium hydroxide thus obtained, which renders inactive a considerable portion of the filtration surface, thus requiring consumption of considerable energy and causing washing difficulties which result in a magnesium hydroxide product containing too high a content of calcium hydroxide.

The present invention obviates these disadvantages. It relates to a process for the conversion of slaked dolomite, i.e., $Mg(OH)_2+Ca(OH)_2$ into magnesium hydroxide, $Mg(OH)_2$, in brines containing essentially $MgCl_2$, which process consists in carrying out the process under such conditions that the product obtained by the reaction of the brine on the hydrated dolomite is in a granular, easily filterable form.

Such a result may be obtained by various methods hereinafter described.

PROCESS 1

The applicant has found that when using dry, pulverulent, slaked dolomite and progressively adding it when dry to an agitated brine of suitable composition (0.15 to 1 mol $MgCl_2$ per liter, and preferably about 0.3), a solid phase became spontaneously flocculated after a few minutes and that the flocculate, characterized by a settling rate of 10–20 mm. per minute, might, without being dispersed, be kept on reacting with the $MgCl_2$ in solution until a concentration of $MgCl_2$ in the solution of about 0.005 mol per liter has been reached.

Such a result may be obtained at 25–35 minutes and if the proportions of the reacting agents employed are such that the concentration of $MgCl_2$ in the brine is maintained at a value not lower than about 0.005 mol per liter, practically all of the lime from the dolomite enters into the reaction without there being any redispersion of the flocculate.

Said flocculate, when separated from the mother brine by decantation, may then without being dispersed, withstand four or five washings by successive dilutions and decantations, providing, however, that the whole contact duration (duration of flocculation plus duration of washing) does not exceed about 90–100 minutes. After these washing steps, the flocs are so cohesive that they are not crushed when subjected to a vacuum of medium value (30–40 cm. mercury) and the flocculate may be filtered at the rate of 20–40 kgs. of MgO per hour per square meter of filtering surface under a vacuum of the value just referred to.

The residual percentage of lime in the filtered product, expressed as CaO/MgO, is from 2 to 3 and the cake has a moisture content of about 58%.

PROCESS 2

The applicant also has found that the time required for washing the flocculate, which in industrial practice cannot usually be limited to 65–75 minutes, as required by the process just described, can be extended to three or four hours and even more with no result of swelling or dispersion of the flocculate, either by adding to the washing water a flocculant which is active in alkaline medium (for instance, 0.5 to 2 cm.³ per liter of wash water of an aqueous starch solution containing 1% by weight of starch) or by maintaining in the liquors at the end of the conversion and during the course of the washing a sufficient amount of $MgCl_2$ (about 0.005 mol per liter), or by adding to the wash water a small quantity of unexhausted brine.

Flocculates obtained in any of these ways can be filtered at the rate of 80–200 kgs. of MgO per hour per square meter of filtering surface under a vacuum of 30–40 cm. of mercury.

The residual percentage of lime in the filtered product, expressed as CaO/MgO, is from 2 to 4 and the residual moisture of the cake is 58–59%.

The last two characteristics of the filtered product, i.e., percentage of retained CaO and moisture content of the filtered product, may be improved by hot precipitation and washing. For example, by carrying out the precipitation (flocculation) and washing at 60° C., a filtered product can be obtained having a moisture content of 51% and a residual percentage of lime, expressed as CaO/MgO, of 1.9, but this is to the prejudice of the rate of filtering which is about 50 kgs. of MgO per hour per square meter of filtering surface.

PROCESS 3

The applicant has found that by using hydrated dolomite in the form of grains (according to his patent application Serial No. 82,400, filed June 19, 1959, now abandoned, for "Process for Hydrating Granulated Alkaline Earth Oxides") instead of using pulverulent slaked dolomite, and by soaking said grains for a few minutes in a brine containing $MgCl_2$ (preferably $MgCl_2$ in an amount between 0.2 and 0.4 mol per liter), said grains can thereafter withstand being in contact with brines wherein the $MgCl_2$ concentration may vary within a wide scope, for instance, from 1 to 0.01 mol per liter, without exfoliating, and can then be washed with water. The proportion of slaked dolomite grains transformed into $Mg(OH)_2$ without bursting or exfoliating into fines may then reach 97%. Furthermore, the low proportion of fines resulting from such process may be recovered by flocculation according to the Processes 1 and 2 hereinabove described.

The permanence of the granulation characteristics of the flocculate and its stability when in contact with brines containing $MgCl_2$ in quantities varying within wide ranges make a continuous counterflow conversion process possible, which simplifies the industrial technology. Moreover, in such case, the flocculate can be separated from the brine at a point in the conversion cycle at which the brine is poor in $CaCl_2$, thereby facilitating washing of the flocculate.

The possibilty of prolonging the time of conversion by using grains of slaked dolomite permits one to obtain residual percentage of lime in the filtered product, expressed as $CaO/MgO$, of 0.9 to 1.3.

The use of slaked dolomite in the form of grains obtained according to the above mentioned patent application Serial No. 821,400 insures an extremely easy and rapid filtration and the obtained grains of $Mg(OH)_2$ are strong enough to be dried without crumbling, thereby avoiding the formation of dust.

The maintenance of the form of the grains may also be facilitated during the washing operation by the means described under Process 2 hereof. The obtention of $Mg(OH)_2$ in the form of grains offers important industrial advantages, in particular as regards its handling and in the feeding of certain furnaces or devices used for carrying out chemical reactions.

The three following Examples I, II and III illustrate respectively Processes 1, 2 and 3 hereinabove described.

The accompanying drawing is a flow sheet illustrating one manner in which Process 3 can be carried out and illustrates the practice of Example III.

*Example I*

The utilized brine contained:

| | Mols per liter |
|---|---|
| NaCl | 3.8 |
| $MgCl_2$ | 1.0 |

One volume of this brine was mixed at ordinary temperature with three volumes of a brine from previous operations and containing:

| | Mols per liter |
|---|---|
| NaCl | 3.8 |
| $MgCl_2$ | 0.05 |
| $CaCl_2$ | 0.95 |

This mixing gave a brine containing:

| | Mols per liter |
|---|---|
| NaCl | 3.8 |
| $MgCl_2$ | 0.3 |
| $CaCl_2$ | 0.7 |

It was then determined what quantity of dry, pulverulent, slaked dolomite would contain an amount of lime which would correspond to the conversion of 0.25 mol of $MgCl_2$ per liter of the mixed brine utilized. The residual amount of $MgCl_2$ in the utilized brine at the end of the operation would then be:

$$0.3 - 0.25 = 0.05 \text{ mol per liter}$$

The quantity of dry, pulverulent, slaked dolomite determined in this manner was poured into the brine at ordinary temperature in a continuous manner and from a height of 30 cm. so that there would not form on the surface of the liquid any floating agglomerate which would solidify in a mass as the dolomite was wetted. The agitation of the brine was regulated in a manner to rapidly disperse the dolomite grains in the liquid.

The introduction of the dolomite was accomplished in six minutes.

The agitation was then reduced to the minimum compatible with maintaining the precipitate in suspension, the initial settling rate of the precipitate being 15–17 mm. per minute.

After 10 minutes at the reduced stirring rate, the flocculation was completed. The liquid between the flocs was clear, the rate of settling of these flocs being about 12 mm. per minute. This rate of settling remained constant until the end of the operation. The stirring operation was continued at the same reduced rate for a period of 10 minutes after flocculation was completed and at the end of this period (26 minutes from the start of the operation), the brine contained about 0.05 mol of $MgCl_2$ per liter.

The stirring operation was then stopped and the flocculate allowed to settled. The volume of the sedimented flocculate was equal to 25% of the initial volume of the brine used. The clear supernatant brine was removed. The deposit (sedimented flocculate) was washed five times with water employing successive dilutions and decantings, each time with a volume of water twice that of the initial brine. Each operation comprised 5 minutes of stirring. The deposit was then filtered under vacuum.

The filterability of the obtained magnesium hydroxide was equivalent to 20 kgs. per hour of MgO per square meter of filtering surface; the residual moisture of the filter cake, representing its loss of weight when heated at 110° C., was 58% and the residual percentage of lime, expressed as $CaO/MgO$, was 2.3.

*Example II*

The utilized brine saturated in NaCl contained 0.3 mol per liter of $MgCl_2$. To this brine there was added, at ordinary temperature, dry, pulverulent, slaked dolomite in an amount determined in the same manner as in Example I, so that the lime contained in the dolomite would correspond to the conversion of 0.27 mol of $MgCl_2$ per liter of the brine used. The residual amount of $MgCl_2$ in the brine at the end of the operation would then be 0.03 mol per liter.

The introduction of the dolomite into the brine was carried out in the same manner as in Example I but took 9 minutes.

The reaction time after the end of said introduction was 30 minutes. After allowing the flocculate to settle, its volume was 16% of the initial volume of the brine used.

The deposit was washed four times with water containing 0.7 cm³. per liter of an aqueous amylum starch solution containing 1% by weight of starch. Each washing, followed by a decantation, was accomplished with a volume of water equal to two times the initial volume of the brine and comprised 40 minutes of agitation. The settling rate of the precipitate was 25 mm. per minute.

After the first washing, a substantial increase in volume of the flocculate was observed, its volume increasing from 16–29% of the initial volume of the brine. During the following three washings, the volume of the flocculate decreased progressively to 26% of the initial volume of the brine without any dispersion, even partial. The filterability of the obtained magnesium hydroxide was 128 kgs. per hour of MgO per square meter of filtering surface; the residual moisture of the cake was 59% and the residual percentage of lime, expressed as $CaO/MgO$, was 3.

*Example III*

The utilized process is illustrated in the accompanying drawing which shows the quantities of liquids (stated in volume) and their $MgCl_2$ content in the different circuits. The utilized brine saturated in NaCl contained 0.35 mol of $MgCl_2$ per liter. Slaked dolomite in the form of grains of 75–280 microns obtained according to the above-mentioned patent application of applicant "Process for Hydrating Granulated Alkaline Earth Oxides," Serial No. 821,400, was introduced in an amount of 37.5 grams (corresponding to 10.5 grams of MgO) per liter of brine. According to said application Serial No. 821,400, the slaked dolomite in the form of grains was obtained by hydrating anhydrous calcined dolomite maintained in the state of a fluid bed by a current of hydrating gas whose pressure of water vapor and temperature enabled the granulometry of the obtained hydrated dolomite to be maintained substantially identical to that of the original anhydrous dolomite.

The present process comprised the following steps:

*Step 1.*—The dolomite was soaked for two minutes in a brine containing 0.25 mol of $MgCl_2$ per liter obtained by mixing 0.3 volume of brine containing 0.35 mol of $MgCl_2$ per liter, supplied through pipe 4, with 0.15 volume of recycled brine containing 0.05 mol of $MgCl_2$ per liter, supplied through pipe 6. The soaking of the dolomite was carried out in a container T.

*Step 2.*—The mixture of soaked dolomite grains and brine partially exhausted by the soaking was transferred from the container T into the container A provided with a stirrer S wherein the grains were kept in suspension in exhausted brine (at about 0.05 mol of $MgCl_2$ per liter). The container A was continuously fed for 15 minutes from container B through pipe 8 with 0.7 volume of brine having a concentration of 0.1 mol per liter of $MgCl_2$. 0.95 volume of exhausted brine having a concentration of 0.05 mol of $MgCl_2$ per liter was withdrawn from the container A through pipe 10 and then after taking off 0.15 volume through pipe 6 for mixture with the primary brine as previously described, the remaining amount (0.8 volume) was discharged from the system through pipe 12.

*Steps 3–7.*—The grains were transferred step by step, successively and with a minimum amount of carrying brine, computed to be 0.2 volume, into containers B, C, D, E and F wherein they were successively brought into contact with brines of increasing $MgCl_2$ content, that is, respectively, 0.1, 0.15, 0.2, 0.25 and 0.3 mol per liter of $MgCl_2$, and allowed to react for increasing periods of time, that is, respectively, 20 minutes, 30 minutes, 45 minutes, 60 minutes and 75 minutes, with $MgCl_2$ contained in brine circulating in the opposite direction. That is, the brine circulated successively from the container F through the containers E, D, C and B to the container A. Container F was supplied with initial brine (0.7 volume containing 0.35 mol of $MgCl_2$ per liter) through pipe 14. In each container A–F, the operating process was the same (except for the duration of the operation and the concentration of $MgCl_2$ in the brine), the grains being kept in suspension in the brine. The impoverishment in $MgCl_2$ due to the reaction with the lime from the dolomite was balanced in each container A–F by a continuous introduction of a richer brine from the preceding container (container F precedes container E, etc.), so that at each step the above mentioned $MgCl_2$ content was maintained due to an equilibrium between the reactivity of the dolomite (which was decreasing as the dolomite moved in the direction from container A to container F), and the reaction times increased when in contact with brines containing more and more $MgCl_2$.

The whole conversion lasted 247 minutes, that is, 4 hours and 7 minutes.

*Steps 8–10.*—The grains treated in container F were transferred into the washer $L_1$ with a certain fraction of brine from container F (0.2 volume) containing 0.3 mol $MgCl_2$ per liter. Wash water in the amount of 0.28 volume was supplied through pipe 16 to washer $L_3$, then through pipe 18 to washer $L_2$ and then through pipe 20 to washer $L_1$. The grains were washed in washer $L_1$ for 30 minutes, then transferred to washer $L_2$ and washed for 10 minutes, and then transferred to washer $L_3$ and washed for 10 minutes, a total washing time of 50 minutes.

The dilution of the brine in washer $L_1$ by water counter-flowing from washers $L_3$ and $L_2$ strongly increased the $MgCl_2$ reactivity on that portion of the lime in the grains which had not yet been converted into $Mg(OH)_2$. However, the complete elimination of $MgCl_2$ in the washing solution would have involved destruction of the grains. Therefore, the proportion of $MgCl_2$ in the wash water in the washers was carefully controlled so as to insure that a minimum concentration of about 0.01 mol of $MgCl_2$ per liter was maintained in the wash water. In this example, this minimum concentration of $MgCl_2$ in the wash water was maintained by supplying a portion of the wash water from the washer $L_1$ to the washer $L_2$ through a pipe 22 and by supplying washer $L_3$ through pipe 24 with a portion of wash water taken from washer $L_2$.

Another way of insuring that there is a minimum concentration of $MgCl_2$ present in the wash water, which minimum quantity is sufficient to prevent dispersion of the grains, is by controlling the proportion of brine supplied to the washer $L_1$ from the container F.

The wash water (0.28 volume containing 0.04 mol of $MgCl_2$ per liter) was discharged from the washer $L_1$ through a pipe 26.

From the washer $L_3$ there was obtained a cake weighing 70 grams and having a moisture content of 56%, that is, 31 grams of $Mg(OH)_2$ (corresponding to 21.5 grams MgO) and 0.2 volume of brine containing only 0.01 mol of $MgCl_2$ per liter.

The whole operation lasted 4 hours and 57 minutes.

The ratio by weight between the amount of MgO collected in the form of grains and the whole amount of produced MgO (comprising the MgO in grains and the impalpable MgO due to bursting or exfoliating into fines in the course of the washings) was equal to 96.5.

The magnesia extraction ratio, i.e., the ratio $$\frac{\text{MgO in the obtained grains}}{\text{MgO in dolomite} + \text{MgO corresponding to } MgCl_2 \text{ used (1 molecule for 1)}}$$

was equal to 88% in weight.

The characteristics of the obtained magnesia were as follows:

Instantaneous filterability
Residual dampness: 56%
Ratio CaO/MgO=0.95

The invention is not limited to the preferred embodiment but may be otherwise embodied or practiced within the scope of the following claims.

I claim:

1. A process of converting dolomite into magnesium hydroxide, which comprises soaking slaked dolomite grains having particle sizes between about 75 and 280 microns for a few minutes in an aqueous brine having a concentration of $MgCl_2$ of 0.2 to 0.4 mol per liter, introducing the soaked grains of dolomite into a series of reactors, the last reactor being fed with brine which circulates in the reactors in the opposite direction to that of the dolomite, the amounts of $MgCl_2$ in the brines in the series of reactors increasing progressively from the first to the last reactor of the series and ranging between 0.05 and 0.35 mol per liter of $MgCl_2$ to cause flocculation of $Mg(OH)_2$ and to convert the $Ca(OH)_2$ of the dolomite into $CaCl_2$, thereafter washing the flocculate with water to remove $CaCl_2$, and maintaining a concentration of $MgCl_2$ in said wash water of at least about 0.01 mol per liter.

2. A process according to claim 1, wherein the mixing of the soaked grains with aqueous brines containing from 0.05 to 0.35 mol per liter of $MgCl_2$ is carried out in a series of steps in which the soaked grains are subjected sequentially to brines having increasing concentrations of $MgCl_2$ and for increasing periods of time.

3. A process of making magnesium hydroxide which is easily filterable and of high purity by reaction between a brine containing $MgCl_2$ and slaked dolomite in grains obtained by hydrating anhydrous calcined dolomite maintained in the state of a fluid bed by a current of hydrating gas whose pressure of water vapor and temperature enable the granulometry of the obtained hydrated dolomite to be maintained substantially identical to that of the original anhydrous calcined dolomite, which comprises soaking said granulated slaked dolomite in a part of the brine, having a $MgCl_2$ concentration of 0.2 to 0.4 mol per liter, then introducing the mixture into a series of reactors in which the dolomite stays for increasing times, the last reactor being fed with another part of the brine which circulates in the reactors in the opposite direction to that of the dolomite, in order to convert substantially all the calcium contained in the dolomite to calcium chloride and all of the magnesium of the brine to magnesia hydrate, eliminating the exhausted brine from the first reactor when this latter still contains about at least 0.01 but not more than about 0.05 mol per liter of $MgCl_2$, then mixing the magnesium hydroxide coming out of the last reactor with counter-flowing cold water, and maintaining constantly in the wash water at least 0.005 mol per liter of $MgCl_2$.

References Cited in the file of this patent

UNITED STATES PATENTS

| | | |
|---|---|---|
| 2,124,002 | Mastin | July 19, 1938 |
| 2,264,448 | Moller | Dec. 2, 1941 |
| 2,348,847 | Pike | May 16, 1944 |
| 2,373,911 | Pike | Apr. 17, 1945 |
| 2,373,913 | Pike | Apr. 17, 1945 |
| 2,394,083 | Luntz | Feb. 5, 1946 |
| 2,771,996 | Hulot | Nov. 27, 1956 |
| 2,893,840 | Vettel et al. | July 7, 1959 |

UNITED STATES PATENT OFFICE
CERTIFICATE OF CORRECTION

Patent No. 3,033,650                                                 May 8, 1962

André Sablé

It is hereby certified that error appears in the above numbered patent requiring correction and that the said Letters Patent should read as corrected below.

In the grant, lines 2, 3, and lines 12 and 13, and in the heading to the printed specification, lines 4, 5 and 6, name of assignee, for "Societe d'Electro-Chemie, d'Electro-Metallurgie et des Acieries Electriques d'Ugine", each occurrence, read -- Societe d'Electro-Chimie, d'Electro-Metallurgie et des Acieries Electriques d'Ugine --; column 2, line 46, for "Ser. No. 82,400" read -- Ser. No. 821,400 --.

Signed and sealed this 4th day of September 1962.

(SEAL)
Attest:

ERNEST W. SWIDER                                         DAVID L. LADD
Attesting Officer                                             Commissioner of Patents